United States Patent
Li et al.

(10) Patent No.: US 8,113,474 B1
(45) Date of Patent: Feb. 14, 2012

(54) MOUNTING APPARATUS FOR DATA STORAGE DEVICE

(75) Inventors: Xiao-Zheng Li, Shenzhen (CN); Guang-Yi Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/979,298

(22) Filed: Dec. 27, 2010

(30) Foreign Application Priority Data

Dec. 13, 2010 (CN) .......................... 2010 1 0584980

(51) Int. Cl.
*A47B 96/00* (2006.01)
(52) U.S. Cl. .............. 248/222.52; 248/221.11; 248/27.1
(58) Field of Classification Search ............. 248/222.11, 248/222.12, 73, 27.1, 221.11, 222.52; 361/679.31, 361/679.32, 679.33, 679.34, 679.35, 724, 361/679.58, 679.36, 679.37, 679.39; 292/162, 292/145, 150, 80, 84, 121, 102, 137, 163, 292/171, 146; 312/223.2, 319.2
See application file for complete search history.

(56) References Cited

U.S. PATENT DOCUMENTS

| | | | |
|---|---|---|---|
| 5,442,513 A * | 8/1995 | Lo | 361/679.35 |
| 5,588,728 A * | 12/1996 | Eldridge et al. | 312/332.1 |
| 5,694,290 A * | 12/1997 | Chang | 361/679.31 |
| 6,377,449 B1 * | 4/2002 | Liao et al. | 361/679.33 |
| 6,563,701 B1 * | 5/2003 | Peng et al. | 361/679.34 |
| 6,956,737 B2 * | 10/2005 | Chen et al. | 361/679.39 |
| 7,492,586 B2 * | 2/2009 | Peng et al. | 361/679.33 |
| 2007/0014085 A1 * | 1/2007 | Meserth et al. | 361/685 |

* cited by examiner

*Primary Examiner* — Terrell McKinnon
*Assistant Examiner* — Eret McNichols
(74) *Attorney, Agent, or Firm* — Altis Law Group, Inc.

(57) ABSTRACT

A mounting apparatus for mounting a data storage device includes a bracket and a blocking member. The bracket includes a front panel and two sidewalls extending from opposite ends of the front panel. The blocking member is positioned between the sidewalls of the bracket opposite to the front panel and pivotably attached to the sidewalls of the bracket.

3 Claims, 5 Drawing Sheets

MOUNTING APPARATUS FOR DATA STORAGE DEVICE

BACKGROUND

1. Technical Field

The present disclosure relates to mounting apparatuses and, more particularly, to a mounting apparatus for a data storage device.

2. Description of Related Art

An electronic device, such as a computer or a server, usually includes a plurality of brackets for mounting hard disk drives (HDD). A dummy HDD is usually received and filled in each bracket to avoid the brackets from being deformed or damaged when manufacturing or transporting these brackets. However, when a true HDD is received in the bracket, the dummy HDD will be thrown away, which causes unnecessary waste.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
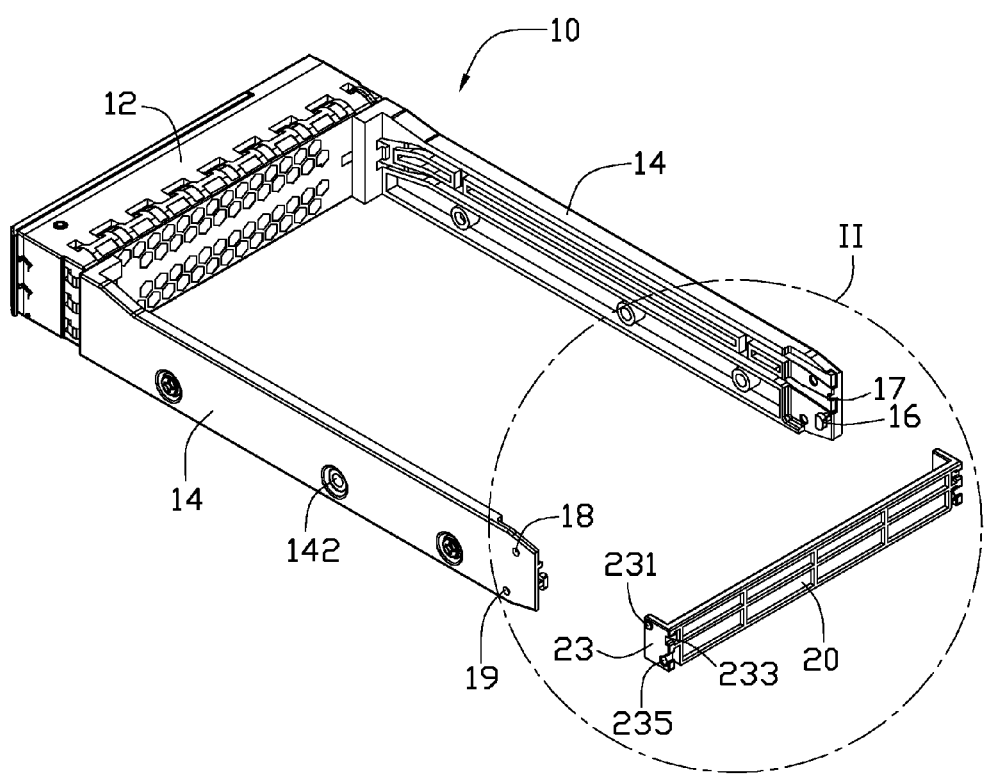
FIG. 1 is an exploded, isometric view of an embodiment of a mounting apparatus for a data storage device.

Referring to FIG. 1, an embodiment of a mounting apparatus is provided to mount a data storage device 100 (shown in FIG. 5), such as a hard disk drive. The mounting apparatus includes a bracket 10, and a blocking member 20.

Figure 2:
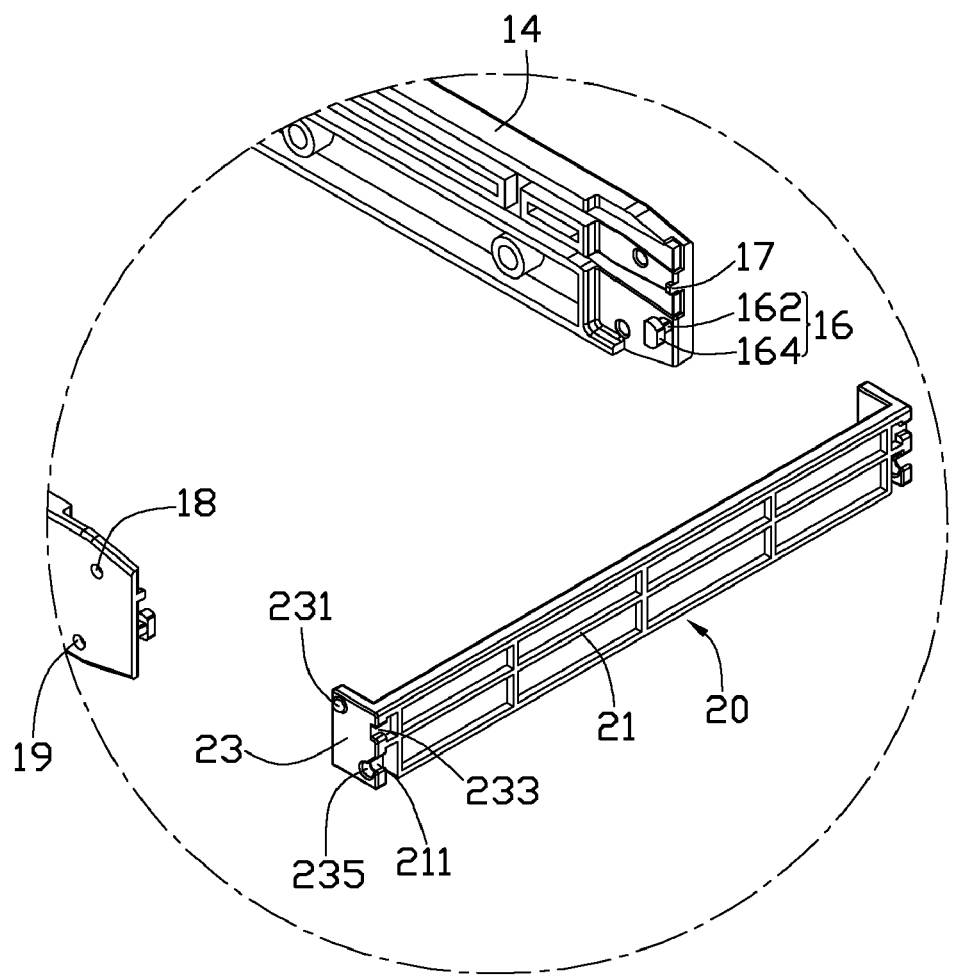
FIG. 2 is an enlarged view of a circled portion II of FIG. 1.

Referring to FIG. 2, the bracket 10 is substantially U-shaped, and includes a front panel 12 and two parallel sidewalls 14 substantially perpendicularly extending from opposite ends of the front panel 12. An opening (not labeled in the figures) is formed between the sidewalls 14 and opposite to the front panel 12. Each sidewall 14 defines a plurality of mounting holes 142. A substantially T-shaped protrusion 16 is formed from an inner surface of an end of each sidewall 14 opposite to the front panel 12. The protrusion 16 includes a pivoting portion 162 extending from the sidewall 14, and a head 164 extending from the pivoting portion 162 opposite to the sidewall 14. A stop portion 17 extends inward from the end of each sidewall 14 adjacent to the protrusion 16. A first positioning hole 18 and a second positioning hole 19 are defined in each sidewall 14 adjacent to the protrusion 16.

The blocking member 20 is substantially U-shaped, and includes a base plate 21 and two parallel side plates 23 substantially perpendicularly extending from opposite ends of the base plate 21. Each side plate 23 forms a raised portion 231 on an outer surface. A stop slot 233 and a pivot slot 235 are defined in an outer surface of each side plate 23 from top to bottom. Two receiving slots 211 are defined in the base plate 21 respectively communicating with the pivot slots 235 of the side plates 235.

Figure 3:
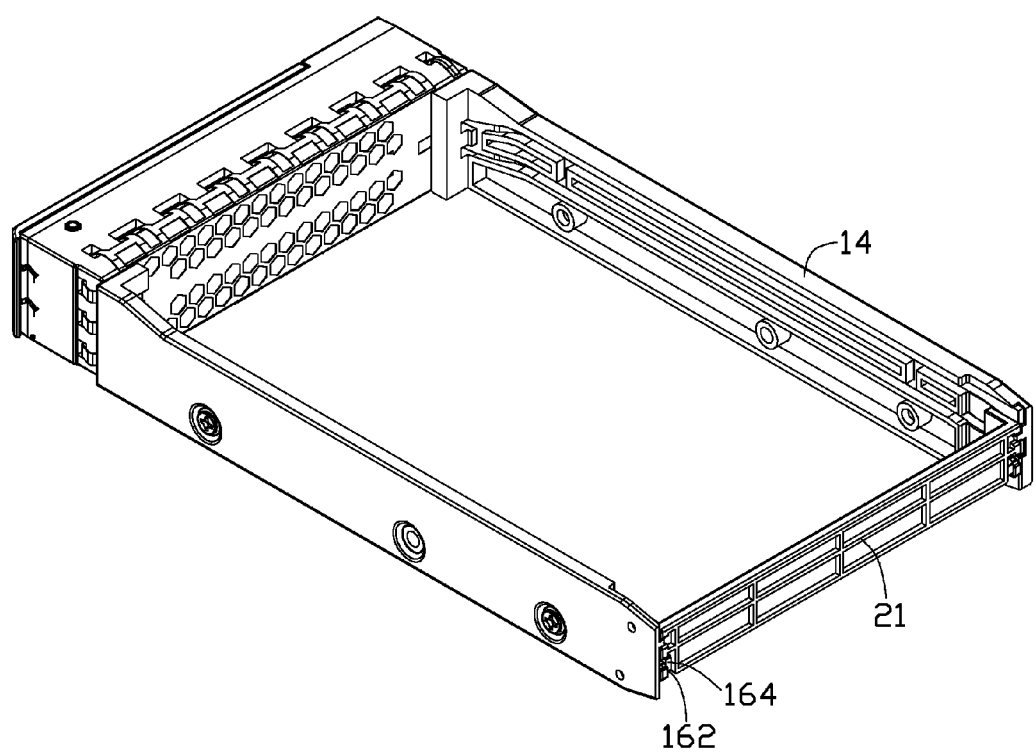
FIG. 3 is an assembled, isometric view of FIG. 1.

Referring to FIG. 3, in assembly, the sidewalls 14 of the bracket 10 are deformed towards each other, allowing the blocking member 20 to be received in the opening of the bracket 10. The pivoting portions 162 of the protrusions 16 of the bracket 10 are respectively received in the corresponding pivot slots 235 of the blocking member 20. The heads 164 of the protrusions 16 are respectively received in the receiving slots 211 of the base plate 21 to avoid the protrusions 16 disengaging from the pivot slots 235.

Figure 5:
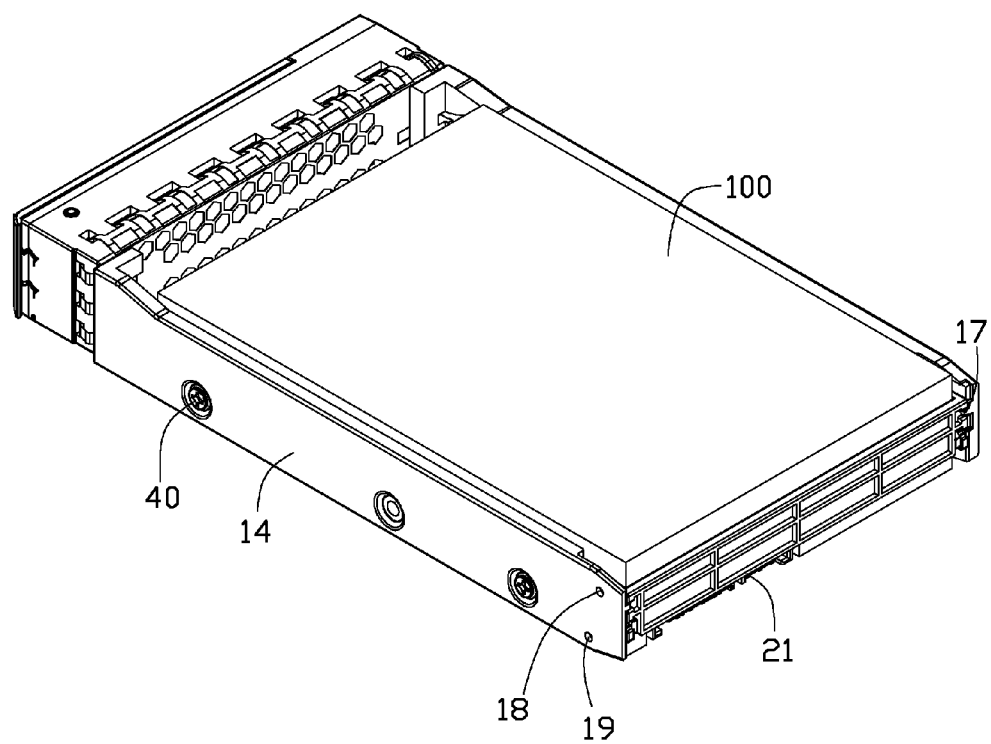

Referring to FIG. 5, to mount the data storage device 100 to the bracket 10, the base plate 21 of the blocking member 20 is pivoted to be upright (substantially parallel to the front panel 12). The stop portions 17 respectively engage in the stop slots 233. The raised portions 231 are respectively positioned in the first positioning holes 18. The data storage device 100 is then sandwiched between the sidewalls 14. A plurality of screws 40 extend through the mounting holes 142 to screw in the data storage device 100.

Figure 4:
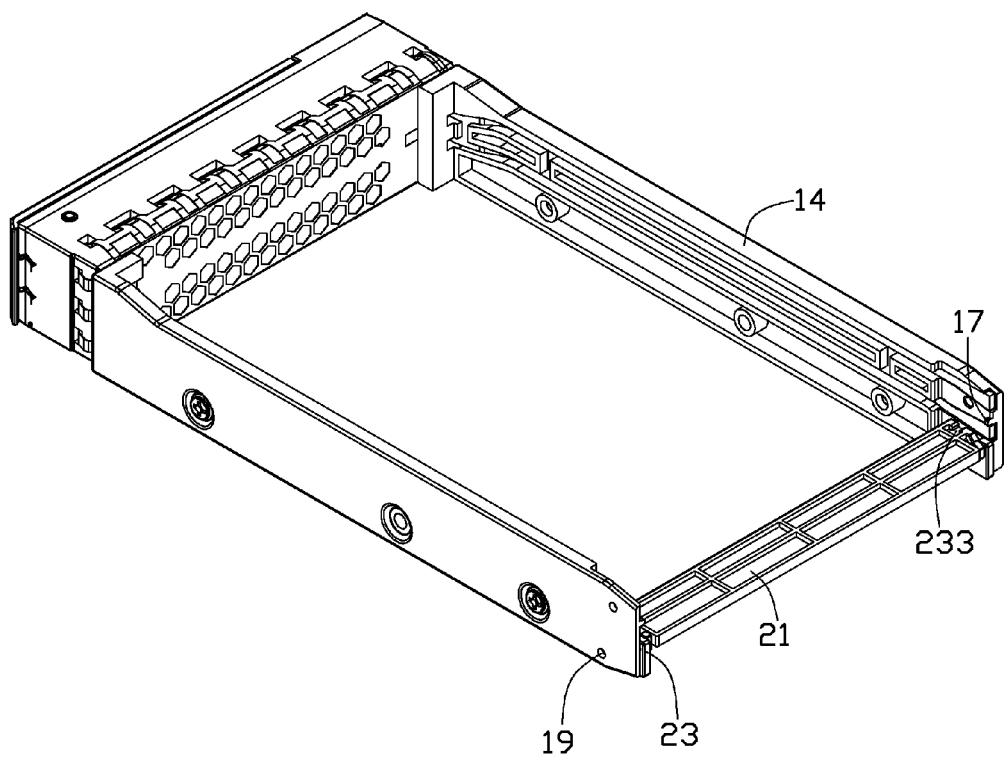
FIGS. 4 and 5 are similar to FIG. 3, but showing different state of use.

Referring to FIG. 4, when the data storage device 100 is not needed, the base plate 21 of the blocking member 20 is pivoted to be horizontal (substantially perpendicular to the front panel 12). The raised portions 231 are respectively positioned in the second positioning holes 19.

In this embodiment, the blocking member 20 is provided between the sidewalls 14 of the bracket 10 to sustain the sidewalls 14, to avoid the bracket 10 being deformed or damaged when manufacturing or transporting the bracket 10. When a data storage device 100 is mounted to the bracket 10, the blocking member 20 needs not be thrown away, which is environmentally friendly.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for mounting a data storage device, the mounting apparatus comprising:
   a bracket comprising a front panel and two sidewalls extending from opposite ends of the front panel, wherein a substantially T-shaped protrusion is formed from an inner surface of an end of each of the sidewalls of the bracket opposite to the front panel, the protrusion comprises a pivoting portion formed from the corresponding sidewall, and a bulged head formed at a distal end of the pivoting portion away from the corresponding sidewall; and
   a blocking member positioned between the sidewalls of the bracket opposite to the front panel and pivotably attached to the sidewalls of the bracket, wherein the blocking member is substantially U-shaped and comprises a base plate and two parallel side plates substantially perpendicularly extending from opposite ends of the base plate, a pivot slot is defined in an outer surface of each of the side plates, and two receiving slots are defined in the base plate respectively communicating with the pivot slots of the side plates;
   wherein the side plates of the blocking member are respectively pivotably attached to the sidewalls of the bracket, the pivoting portions of the protrusions are pivotably received in the pivot slots, and the heads of the protrusions are respectively received in the receiving slots of the base plate to avoid the protrusions disengaging from the pivot slots wherein the pivot hole enables the base plate to rotate to a horizontal position when the data storage device is not needed.

2. The mounting apparatus of claim 1, wherein a stop portion extends inward from the end of one of the sidewalls, a stop slot is defined in an outer surface of one of the side plates, the stop portion is detachably engaged in the stop slot to position the blocking member relative to the bracket.

3. The mounting apparatus of claim 1, wherein a first positioning hole and a second positioning hole are defined in each sidewall, a raised portion is formed on an outer surface of one of the side plates, the raised portion is selectively positioned in the first positioning hole or the second positioning hole.

\* \* \* \* \*